No. 811,517. PATENTED JAN. 30, 1906.
S. A. McCUNE.
WEEDER TOOTH.
APPLICATION FILED SEPT. 22, 1905.

Witnesses
J. G. Stinkel
B. C. Rust

Samuel A. McCune, Inventor
by Foster Freeman & Watson
Attorneys

UNITED STATES PATENT OFFICE.

SAMUEL A. McCUNE, OF NEW WATERFORD, OHIO.

WEEDER-TOOTH.

No. 811,517.  Specification of Letters Patent.  Patented Jan. 30, 1906.

Original application filed October 27, 1904, Serial No. 230,204. Divided and this application filed September 22, 1905. Serial No. 279,670.

*To all whom it may concern:*

Be it known that I, SAMUEL A. MCCUNE, a citizen of the United States, residing in the city of New Waterford, in the county of Columbiana and State of Ohio, have invented certain new and useful Improvements in Weeder-Teeth, of which the following is a specification.

The present invention relates to improvements in teeth for that class of agricultural implements known as "weeders;" and the object of the invention is to provide a tooth for such an implement which will engage the ground over which it travels with just sufficient force to properly remove the weeds or undesired growth without injuring the young plants and which will be maintained in proper position after encountering or passing over an unyielding obstruction. A tooth of this character is illustrated and described in my application for Letters Patent of the United States, filed October 27, 1904, Serial No. 230,204, of which this application is a division.

Figure 1:
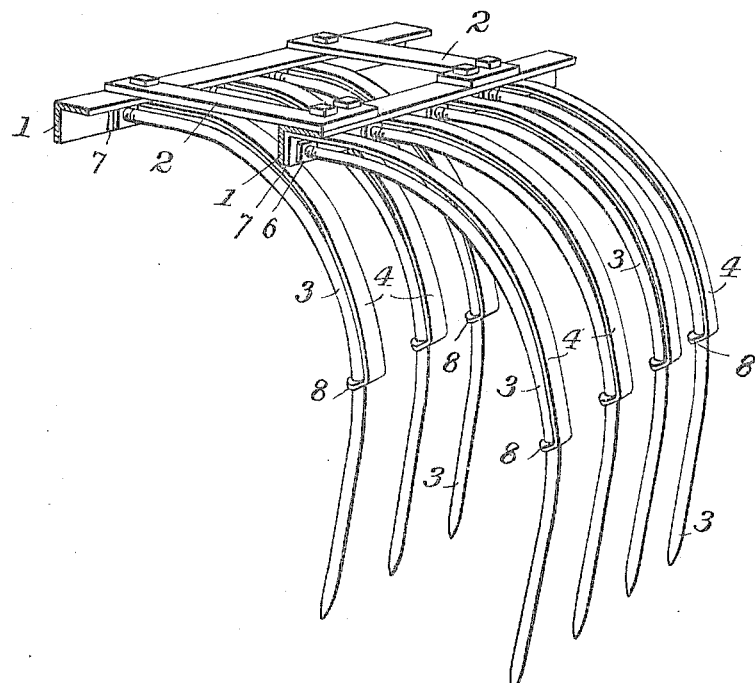
Figure 2:
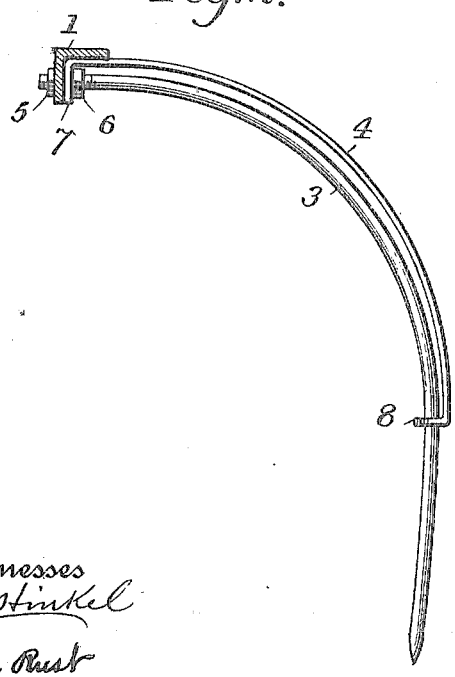
Figure 3:
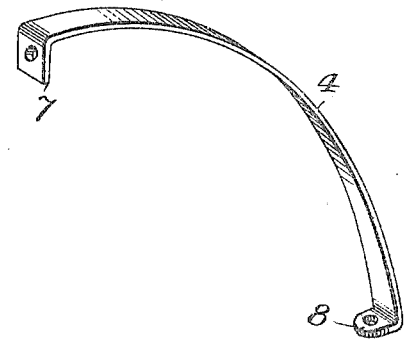

In the accompanying drawings, Figure 1 is a perspective view of a portion of a weeder having teeth constructed in accordance with the present invention. Fig. 2 is a detail view of one of the teeth, a portion of the frame being shown in section. Fig. 3 is a view of the tension spring or guard of the tooth detached.

Referring to the drawings, the frame of the machine, as shown, includes two parallel angle-bars 1, having their horizontal top flanges connected by cross bars or plates 2. It will be understood that the frame is to be mounted in any suitable manner on supporting-wheels and that the construction of the frame itself does not form any part of the present invention, and therefore is only illustrated conventionally—that is, said frame may include one or more angle-bars 1, and if more than one of such bars are employed they may be connected together and to other parts of the frame either by such means as are illustrated or by any other suitable means.

To each of the bars 1 of the supporting-frame are connected any suitable number of teeth, each comprising a section 3 of longitudinally-curved round wire, having one end pointed and its other end connected with the angle-bar 1, and a tension-spring or guard 4, formed of a flat resilient strip, both ends of which are bent inwardly and engaged with the section 3 of the tooth. The tooth is so curved that the lower section thereof extends substantially vertical or is inclined but little from the lower end of the guard 4 to its free pointed end, which is adapted to penetrate only slightly below the surface over which the tooth moves. The upper end of the tooth is firmly connected with the angle-bar 1; but the wire of which the section 3 is formed is of such character and shape as to provide a very flexible trailing tooth. The connection between the tooth and frame may be of any suitable character. As shown, the upper end of the section 3 is threaded and passed through a suitable aperture in the vertical section of the angle-bar 1 of the supporting-frame and is held in position by nuts 5 6, engaging said threaded section on opposite sides of the frame-bar.

The guard 4, which is formed from a flat strip of resilient material of the desired length, has its ends bent inwardly, as at 7 8, and said bent portions are provided with suitable apertures, through which the round section 3 of the tooth extends. The upper end of said guard is so shaped that it bears squarely against both the vertical and horizontal members of the angle-bar 1, the section 7 of said guard extending between the nut 6 and the vertical member of the frame-bar, whereby the upper end of said guard is firmly secured in position on the frame.

The shield or guard 4 constitutes not only a tension-spring for holding the point of the tooth in engagement with the ground over which the implement is moved, but also prevents any side or lateral vibration of the lower end of the tooth and maintains it in the desired path—that is, as it engages the tooth at both ends said guard acts to hold the lower pointed end in the desired operative position or to return it to such position after it has been moved rearward by contact with an unyielding obstruction. In case the point of the tooth strikes such an obstruction the guard will permit it to rise and move sufficiently rearward to pass over the obstruction, but will prevent the lower end of the tooth from springing forward beyond its proper substantially vertical position after passing the obstruction. It also effectually prevents the displacement of the point of the tooth from such position—that is, prevents said point from sliding forward or trailing rearward from the proper substantially vertical position—when, as is frequently necessary in operating the implement over hard ground, the main supporting-frame is provided with an additional weight. The main body of the tooth is of the same cross-sectional form throughout its length, and the guard is formed from a flat strip, said parts being so assembled and connected to the frame that either can be readily removed and replaced, if desired.

Having thus described the invention, what is claimed is—

1. In a weeder, the combination with a supporting-frame, of a longitudinally-curved trailing tooth attached to said frame at one end, and a resilient strip or guard extending longitudinally of said tooth from its support and having both ends engaging the tooth.

2. In a weeder, the combination with a supporting-frame including a transverse angle-bar, of a longitudinally-curved tooth secured to and depending from said bar, a resilient bar or guard arranged to extend longitudinally of and having both both ends engaging said tooth, the said guard bearing at one end against both the horizontal and vertical flanges of the angle-bar of the supporting-frame, and means for holding said bar in position.

3. In a weeder, the combination with a supporting-frame including a transverse angle-bar, of a tooth comprising a longitudinally-curved section substantially round in cross-section throughout its length and having its upper end connected to said angle-bar, and a resilient guard engaging said curved section at both ends and bearing against the horizontal member of said angle-bar.

4. In a weeder, the combination with a supporting-frame including a transverse angle-bar, of a tooth comprising a longitudinally-curved section connected at its upper end to said angle-bar and having its lower end pointed and a separately-formed resilient guard extending longitudinally over and having both ends engaging said curved section, and means for securing the upper end of said guard to the said angle-bar of the supporting-frame.

5. In a weeder, the combination with a supporting-frame, of a weeder-tooth consisting of a longitudinally-curved body substantially round in cross-section, attached to said frame at its upper end, and a resilient strip or guard extending longitudinally of and having both ends engaging the body of the tooth.

6. The herein-described weeder-tooth including a longitudinally-curved body, substantially round in cross-section, and a guard, formed of a flat strip, arranged over a portion of said body, both ends of said guard being bent inwardly and engaging the curved body of the tooth.

In testimony whereof I affix my signature in presence of two witnesses.

SAMUEL A. McCUNE.

Witnesses:
C. F. JANNESON,
CYRUS MERCER.